(12) United States Patent
Kallio

(10) Patent No.: US 8,655,329 B2
(45) Date of Patent: Feb. 18, 2014

(54) DOWNLOADABLE PROFILES FOR MOBILE TERMINALS

(75) Inventor: Juha Kallio, Helsinki (FI)

(73) Assignee: Nokia Corporation, Espoo (FI)

( * ) Notice: Subject to any disclaimer, the term of this patent is extended or adjusted under 35 U.S.C. 154(b) by 1266 days.

(21) Appl. No.: 10/517,442

(22) PCT Filed: Jun. 6, 2003

(86) PCT No.: PCT/IB03/02507
§ 371 (c)(1),
(2), (4) Date: Dec. 23, 2004

(87) PCT Pub. No.: WO03/107620
PCT Pub. Date: Dec. 24, 2003

(65) Prior Publication Data
US 2005/0227677 A1    Oct. 13, 2005

(30) Foreign Application Priority Data
Jun. 12, 2002  (GB) .................................. 0213479.9

(51) Int. Cl.
*H04L 29/06*    (2006.01)
*H04W 24/00*    (2009.01)

(52) U.S. Cl.
USPC .................................... 455/414.3; 455/456.1

(58) Field of Classification Search
USPC .............. 455/414.1, 461, 550, 410, 405, 466, 455/436, 550.1, 566, 502, 552.1, 406, 407, 455/408, 451
See application file for complete search history.

(56) References Cited

U.S. PATENT DOCUMENTS

| | | | |
|---|---|---|---|
| 7,068,189 B2 * | 6/2006 | Brescia ......................... 340/531 |
| 7,249,100 B2 * | 7/2007 | Murto et al. ..................... 705/50 |
| 7,308,237 B2 * | 12/2007 | Kokkonen et al. ......... 455/185.1 |
| 7,589,628 B1 * | 9/2009 | Brady, Jr. ................. 340/539.11 |
| 7,663,479 B1 * | 2/2010 | Bajpay et al. ................. 340/506 |
| 7,813,719 B2 * | 10/2010 | Chiu et al. .................. 455/412.2 |
| 7,814,182 B2 * | 10/2010 | Cadigan et al. ............... 709/220 |
| 7,847,684 B1 * | 12/2010 | Brady, Jr. ................. 340/539.11 |
| 7,876,214 B1 * | 1/2011 | Brady, Jr. ................. 340/539.11 |
| 2002/0002586 A1 | 1/2002 | Rafal et al. |
| 2002/0173295 A1 * | 11/2002 | Nykanen et al. ............. 455/414 |
| 2004/0043758 A1 * | 3/2004 | Sorvari et al. ............. 455/414.1 |
| 2004/0142711 A1 * | 7/2004 | Mahonen et al. ............. 455/502 |
| 2004/0202132 A1 * | 10/2004 | Heinonen et al. ............. 370/331 |
| 2005/0107114 A1 * | 5/2005 | Ocock ........................ 455/550.1 |

FOREIGN PATENT DOCUMENTS

| | | | | |
|---|---|---|---|---|
| GB | 2 356 321 A | | 5/2001 | |
| GB | 2356321 A | * | 5/2001 | ............... H04Q 7/22 |

* cited by examiner

*Primary Examiner* — Melody Mehrpour
(74) *Attorney, Agent, or Firm* — Ditthavong Mori & Steiner, P.C.

(57) ABSTRACT

There is disclosed a method of providing a profile to a mobile terminal, the method comprising: allocating a profile to a specific event; detecting an association of a mobile terminal with said event; and transmitting said profile to said mobile terminal.

24 Claims, 2 Drawing Sheets

DOWNLOADABLE PROFILES FOR MOBILE TERMINALS

FIELD OF THE INVENTION

The present invention relates to downloadable profiles for mobile terminals.

BACKGROUND OF THE INVENTION

Mobile terminals have become more and more important in society as a tool as well as a showcase for people all around the world. One of the more important aspects in current mobile phone design is the ability to personalise one's own phone with changeable covers, different stickers, etc. Users wish to control the image projected to other people by their possessions and this includes mobile phone terminals. This trend of mobile phone personalisation is extending into the actual software design of mobile terminals. Colour displays and programmable menus (with third party application add-ons) will lead to many more ways of customising the "look and feel" of the user interface and desktop by the end user.

History has proved that technical innovations which are targeted either to technically skilled end users or marginal groups of users will not manage to succeed in the long run. The same is true with the design and user interfaces, one of the most important factors in mobile terminals.

Current mobile terminals have so-called profiles, these are collections of user settings or preferences that the end user can automatically manage together. Such settings are, for example, ringing tone, volume of tone or maybe the silent mode of the phone. In the future profiles will become more situation dependent, for example by integrating the whereabouts of the end user.

Current mobile terminals also have end user managed "groups" which can be used to collect different people together into one entity. This group may then have a unique ringing tone or icon which is displayed when someone from the group calls.

Profiles and subscriber groups are currently managed by the end user by a local user interface of the mobile terminal. The current system of profiles is very limiting. There exists only profiles which the end user can customise locally or download from Club Nokia-like websites. These profiles are very inflexible by nature (silent, general, etc) and only a small number of features are customable. It is not possible at present to customise existing profiles based on on-going events as described in this invention.

Customising mobile terminals is very popular, and there has been a large take-up of the limited amount of customisation which is available at present.

It is an object of the present invention to provide for mobile terminals to be further customised by the provision of improved profile information.

SUMMARY OF THE INVENTION

According to the present invention there is provided a method of providing a profile to a mobile terminal, the method comprising: allocating a profile to a specific event; detecting an association of a mobile terminal with said event; and transmitting said profile to said mobile terminal.

Said event is preferably a location dependent event, the step of detecting an association of a mobile terminal with said event comprising detecting a location of the mobile terminal. Said event is further preferably a time dependent event, the step of detecting an association of a mobile terminal with said event further comprising detecting the location of the mobile terminal within a predetermined time period. The predetermined time period preferably corresponds to duration of the event.

The method may further comprise removing said profile from said mobile terminal responsive to termination of said event. The removing step preferably comprises transmitting a termination signal to said mobile terminal responsive to which said profile is deleted. The profile may be removed responsive to the mobile terminal leaving the location associated with an event.

The profile may include a link to event specific information. The profile may include the identity of an instant community.

The invention further provides an application server for providing an event specific profile to at least one mobile terminal, including: a first communications interface for providing a mobile network with event specific information; a second communications interface for receiving details of a mobile terminal associated with said event specific information; and a third communications interface for transmitting the event specific profile to the mobile terminal associated with said event specific information.

The event is preferably a location dependent event. The event is further preferably a time dependent event.

The event specific information is a geographical location.

The second communications interface preferably receives details of a mobile terminal located in said location. Said details include the identity of the mobile terminal. The first and second communications interface may be a fixed line communication interface. The third communication interface may be a mobile wireless communication interface. The third communication interface is preferably a GPRS or Bluetooth interface.

In a still further aspect the present invention provides a communication system for providing event specific profiles to mobile terminals, comprising: an application server associated with the event; a mobile communication network for receiving event specific characteristics from the application server; and at least one mobile terminal for connection in said network; wherein the mobile network notifies the application server if the mobile terminal is associated with said event, and when responsive thereto the application server transmits the event specific profile to said mobile terminal.

The invention thus offers the possibility for event organisers to customise their customers mobile terminals during an event. Advantageously, the distribution of relevant information can be handled by downloadable profiles. The invention allows for the possibility of the creation of instant communities that allow users with similar interests within the event to be brought together.

BRIEF DESCRIPTION OF DRAWINGS

For a better understanding of the present invention, reference will now be made by way of example to the accompanying drawings in which.

DESCRIPTION OF PREFERRED EMBODIMENT OF THE INVENTION

The invention is described herein with reference to a particular example, for the purpose of illustrating the operation of the invention. However the invention is not limited in its application to such an example, and one skilled in the art will appreciate, from reading the description, the broader applicability of the present invention. For the purposes of this example, it is assumed that an event provider wishes to provide an event specific profile. In this particular example, the event is location dependent. That is, the event provider is providing an event in a particular location. For example such an event may be a conference or a party, and the event specific profile may be specific to the location within which the conference or party is held.

Figure 1:
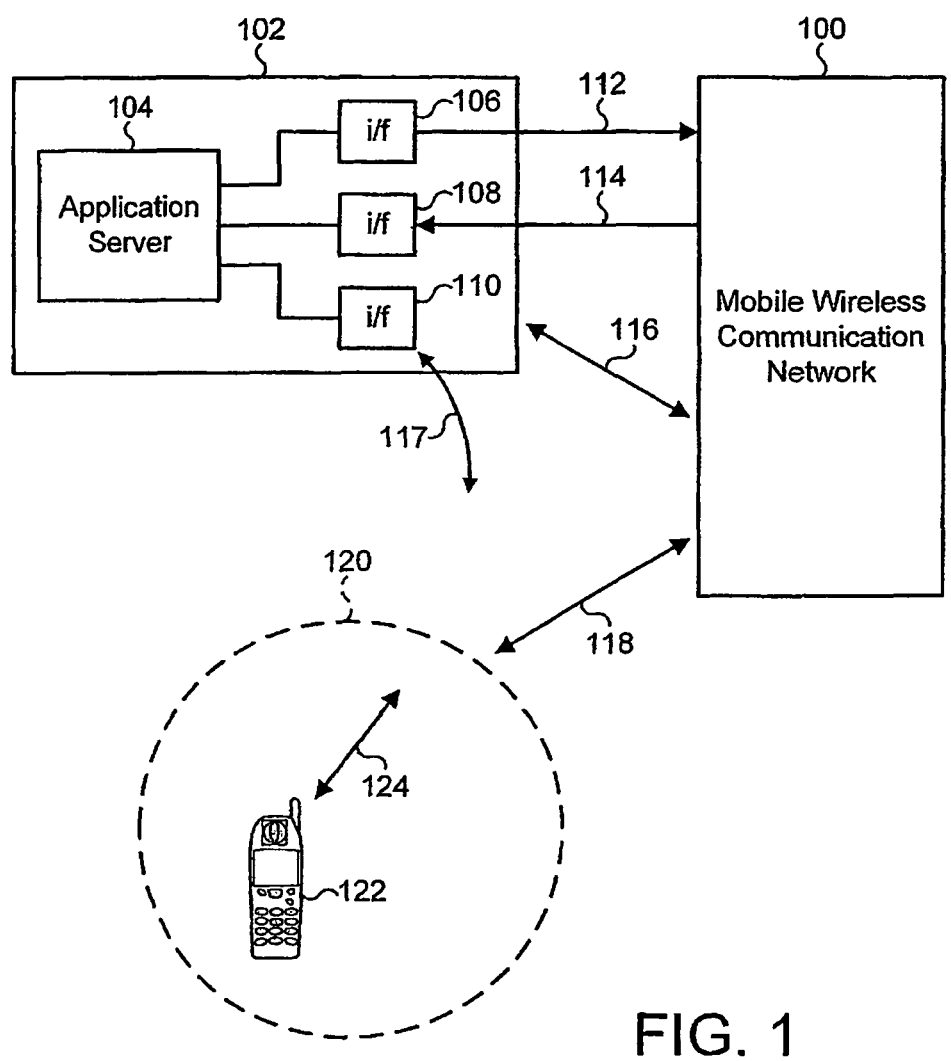
FIG. 1 shows an example implementation of a communication system in which the present invention may be utilised.

Reference is made to FIG. 1 which is a block diagram illustrating an example scenario for implementing the present invention. Referring to FIG. 1 there is illustrated a mobile wireless communication network (MWCN) 100, an application server 104 with three interfaces 106, 108, 110 and a mobile terminal 122. The application server 104 and interfaces 106,108,110 are provided, in the present example, as part of a computer system 102 associated with the event provider. Such computer system may be provided at the event provider's premises, at the location of the event, or otherwise. It will be understood from the following that the location of the application server 104 is not important to the present invention.

FIG. 1 also shows the location area of the location dependent or location specific event, which is represented by the dashed circle 120. In this example, the dashed circle 120 represents a specific geographical location, within which the event provider is providing an event.

The mobile wireless communication network 100 preferably communicates with the application server 104, via one of the interfaces 112,114,116, either through fixed line connections or through wireless connections. The mobile terminal 122 is connected to communicate with the mobile wireless communication network 100 and the application server 104 via, for example, GPRS or a Bluetooth connections.

The event provider, as discussed above, wishes to provide an event specific profile to any mobile terminal user located in the event area 120. In order to provide this event specific profile, the event provider needs to be able to identify any mobile terminal located in the location area 120. Once any such mobile terminal is identified, the event provider downloads the event specific profile to the mobile terminal.

A preferred embodiment of the invention is now described in detail with reference to FIGS. 1 and 2.

Figure 2:
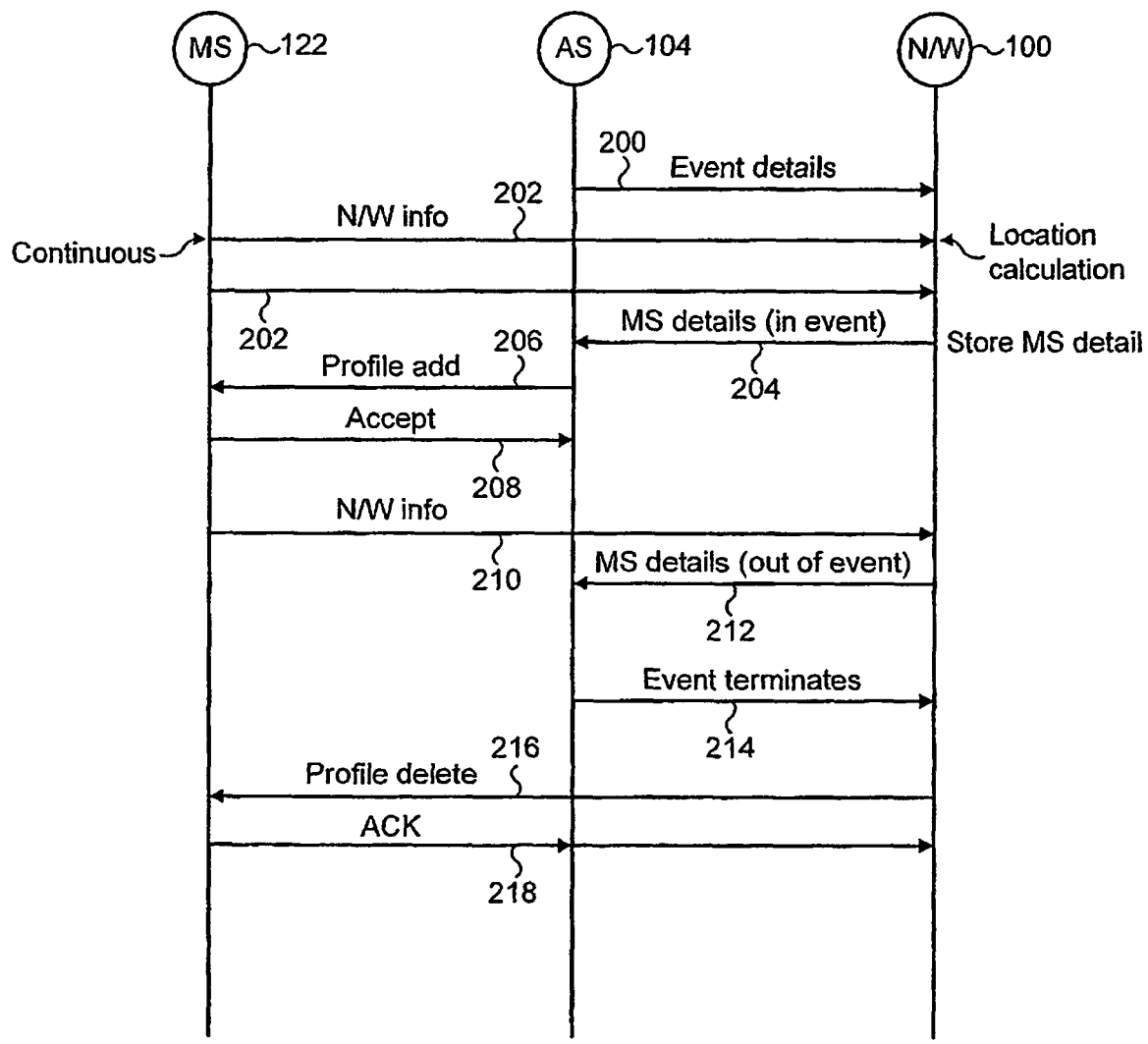
FIG. 2 shows a signalling chart illustrating in detail an exemplary message flow in the system of FIG. 1 in accordance with an illustrative embodiment of the present invention.

In an initial step, represented by arrow 200 in FIG. 2, the application server 104 transmits details of an event to the mobile wireless communication network via interface 106 on communication link 112. In this example it is assumed that the communication link 112 is a fixed land line, although the link may be a land or wireless line. It is assumed that the event provider has already registered with the provider of the mobile wireless communications network for the provision of certain services.

In the present example, the details of the event transmitted to the mobile wireless communication network are the details of the geographical location within which the event is being held. Thus the application server may provide the mobile wireless communication network with the location coordinates of the event area.

In providing the mobile wireless communication network with the details of the event, the application server 104 associated with the event provider also requests to be notified by the mobile wireless communication network 100 when any user of the network enters the event location. The mobile wireless communication network 100, or more specifically an application server associated therewith, stores the details of the event, and when any user of the network 100 becomes associated with such event, notifies the application server 104 as described in further detail hereinbelow.

Any mobile station, such as mobile station or mobile terminal 122, which is associated with and connected in the network 100 is continually in contact with the network 100. The mobile station 122 receives and transmits radio signals as represented by arrow 124 in FIG. 1. The mobile wireless communication network transmits and receives radio signals as represented by arrow 118 in FIG. 1. As is well known in the art, the network 100 is provided with means for calculating the position of any mobile terminal connected therein. As such, the network 100 continually monitors the location of any terminal connected thereto. This is represented in FIG. 2 by the mobile station 122 transmitting network information and data signals represented by arrow 202 to the mobile wireless communication network 100.

As the mobile station 122 moves into the event area 120, the presence of the mobile station in the event area is detected by the mobile wireless communication network 100. Responsive to such detection, as represented in FIG. 2, the mobile wireless communication network 100 transmits the details of the mobile station 122 to the application server 104 via the interface 108, on signal line 114 in FIG. 1. Thus the application server 104 is notified of the presence of the mobile station 122 in the event area 120 via the network 100.

The capability of the mobile station 122 to receive a particular profile is preferably determined by the application server 104. This process can be done based on prestored information (e.g. a company database having details of an end user's preference), or dynamically e.g. based on the international mobile equipment identifier (IMEI) of a mobile station, provided by the network 100 in signal 204. These IMEIs are known by the network.

Once it has been determined that the mobile station is capable of receiving the event specific profile, the application server 104 uploads the 'custom' or event specific profile package to the mobile station 122 as represented by signal 206 in FIG. 2. The profile package download can be performed in a variety of ways, and the invention is not limited in this respect. For example the event specific profile may be transmitted via the interface 110 to the mobile station 122 over a local communication such as Bluetooth or an infra red link 117. Alternatively, the event specific profile may be transmitted by the interface 116 over a wireless radio link 116 via the network 116 as a GPRS signal.

The event specific profile package may either be automatically accepted by the mobile station 122 (based on pre-configured settings), or a dialogue requesting acceptancy from the mobile station 122 could be shown. In the example shown in FIG. 2, it is assumed that an acknowledgement from the mobile terminal is required, as represented by signal 208.

In this example it is assumed that the profile is transmitted to the mobile terminal with signal 206, and receipt of the profile acknowledged with signal 208. In an alternative, the signal 206 may be a request to transmit the profile, and the profile may be only transmitted to the mobile station responsive to the acknowledgement or acceptance of signal 208.

In one embodiment of the invention, the mobile terminal may have one or more memory "slots" to store profile packages. The mobile terminal preferably does not overwrite any profile(s) that existed before the download of the new event specific profile. After receiving the event specific profile, the end user of the mobile station 122 is preferably able to choose freely between newly downloaded profiles and any one that already existed earlier in the terminal. In an alternative, the event specific profile may be automatically enabled on download.

After the event specific profile has been installed in the mobile station, it is possible for the profile to be announced to the user. For example a specific tune may be part of the event specific profile, and this may be played to indicate to the user of the mobile station 122 that the event specific profile is loaded in the phone. Alternatively a default tone (set by the end user or the terminal vendor) can be played to inform the end user of the receipt and successful installation of the event specific profile.

The event specific profile could be an extended profile. For example, the extended profile could include:

- Wallpaper that customises the mobile terminal's display with a suitable picture relating to the event.
- Customised welcome sound/tone, e.g. stored in AMR-format (using the RTP payload format). This tone could be played automatically or on demand, but only within the location of the event.
- Icon(s) which are added to the menu of the mobile terminal. These may link to the agenda of the event, or other back-drop information regarding the event. Such a link could be a direct external application server (e.g. a WAP page) or could be over the air downloaded MIDlet (Java application).

One extra aspect of such an event specific downloadable profile is the possibility of creating instant community groups, which could either be pre-stablished by the provider of the event or automatically established (by a network 100 application) based on the attendees of the event. That is, the network may establish all the users in the event area 120, and thereby establish an instant community amongst such users. The network operator may offer the establishment of such 'automatic' instant communities as part of a service to the event provider. These instant communities could also be established by the application server 104, based on the mobile stations identified thereto by the network 100.

The instant communities may be established based on either prestored preferences (such as sex, age, hobbies, etc) or based on preferences provided by a mobile terminal associated with the event. Depending on the capabilities of the mobile terminal, any established instant community groups could be 'pushed' to the mobile terminals together with a profile of the event by the application server 104. The end user of a mobile station 122 may use an instant community group to, for example, chat (e.g. via SMS, or SIP over GPRS), establish private calls possibly with special pricing, and store information for later use. This information is preferably stored in the non-volatile storage of the mobile terminal (e.g. personal phone book or (U)SIM). It may be important that a downloaded instant community group is not stored to the non-volative memory of mobile terminals, but to the free memory reserved for temporary use.

Thus instant communities may be identified and downloaded to mobile stations in the same manner as the event specific profiles.

Referring again to FIG. 2, the network 100 continually receives signals 210 including network information from the mobile station 122, which information is used to determine an updated location for the mobile station. If the network 100 detects that the mobile station 100 is no longer in the event area, then the details of such mobile station are transmitted to the application server as represented by signals 212. Responsive to notification of the mobile station leaving the event area, the application server removes the details of the mobile station from any lists established, and from any instant communities established. Preferably, the event specific profile downloaded to the mobile station that has now left the event area, is removed. This may be done by the application server requesting the network to transmit an appropriate control signal to the mobile terminal, or by the network automatically transmitting a 'profile delete' signal to the mobile terminal when the signal 212 is transmitted. Alternatively, event specific profile may be left on the user's mobile station, for the user to decide whether to delete it or not.

Similarly, it may be required to delete the event specific profile when the event terminates, for example if the conference comes to an end. Again, it may be left for a user to determine if they wish to delete the event specific profile. Referring to FIG. 2, when the event terminates the application server 104 preferably notifies the network 100 by transmitting an appropriate signal 214.

The network 100 may then transmit a signal 216 to the mobile station to delete the event specific profile, and the mobile station 122 may transmit an acknowledgement signal 218 back. However, no such specific deletion of the event specific profile may be required.

If the event ends, the application server 104 may transmit signals to the mobile terminals in the event area using Bluetooth or infra-red communications, rather than transmitting a signal through the network 100. However any terminals no longer in the local area would have to be communicated with through the network 100.

The initiation of the deletion of the event specific profile preferably deletes any other information downloaded therewith, thus freeing the memory of the mobile terminal for further use and other profiles. It may be preferable to remove both the IC groups and the downloaded profile. This may be done automatically by the mobile terminal (e.g. profile and IC group could both have a "time to live" parameter which is controlled by profile/IC group manager applications in a terminal site). Alternatively the application server 104 may be used to trigger the offload of profiles and IC groups (e.g. via GPRS connection) based on, for example, time of day or notification of a location update from the serving core network 100.

The present invention has been described herein by way of reference to a particular exemplary embodiment. It will be understood that the invention is not limited to the applications described herein. In particular, the invention is more broadly applicable than the specific examples given. The invention, and the scope of protection afforded, is defined by the appended claims.

The invention claimed is:

1. A method, comprising:
   determining profile reception capabilities of a mobile terminal, wherein the determining profile reception capabilities comprise determining the capability of the mobile terminal to install a particular profile;
   allocating a profile to a specific event, wherein the profile comprises a collection of user settings or preferences that an end user collectively manages;
   detecting an association of the mobile terminal with said event; and
   based on the determining, transmitting said profile to said mobile terminal;
   wherein the profile is an extended profile including at least one icon added to a menu of the mobile terminal, such that the at least one icon links to information regarding the event.

2. A method according to claim 1, wherein said profile includes a custom or event specific profile package.

3. A method according to claim 1, further comprising: installing the profile in said mobile station.

4. A method according to claim 1, wherein said event is a location dependent event, and wherein detecting an association of a mobile terminal with said event comprises detecting a location of the mobile terminal.

5. A method according to claim 4, wherein said event is further a time dependent event, and detecting an association of a mobile terminal with said event further comprises detecting the location of the mobile terminal within a predetermined time period.

6. A method according to claim 5, wherein the predetermined time period corresponds to duration of the event.

7. A method according to claim 1, further comprising: removing said profile from said mobile terminal responsive to termination of said event.

8. A method according to claim 7, wherein said removing comprises transmitting a termination signal to said mobile terminal responsive to which said profile is deleted.

9. A method according to claim 8, wherein the profile is removed responsive to the mobile terminal leaving the location associated with an event.

10. A method according to claim 1 wherein the profile includes the identity of an instant community.

11. An apparatus, comprising:
a determining server configured to determine profile reception capabilities of a mobile terminal, wherein the determining server is configured to determine the capability of the mobile terminal to install a particular profile, wherein the profile comprises a collection of user settings or preferences that an end user collectively manages;
a first communications interface configured to provide a mobile network with event specific information;
a second communications interface configured to receive details of the mobile terminal associated with said event specific information; and
a third communications interface configured to transmit the event specific profile to the mobile terminal associated with an event specific information;
wherein the profile is an extended profile including at least one icon added to a menu of the mobile terminal, such that the at least one icon links to information regarding the event.

12. An apparatus according to claim 11, wherein said profile includes a custom or event specific profile package.

13. An apparatus according to claim 11, wherein the event is a location dependent event.

14. An apparatus according to claim 11 wherein the event is further a time dependent event.

15. An apparatus according to claim 11, wherein the event specific information is a geographical location.

16. An apparatus according to claim 11, wherein the second communications interface receives details of a mobile terminal located in said location.

17. An apparatus according to claim 16, wherein said details include the identity of the mobile terminal.

18. An apparatus according to claim 11, wherein the first and second communications interface are a fixed line communication interface.

19. An apparatus according to claim 11, wherein the third communication interface is a mobile wireless communication interface.

20. An apparatus according to claim 19, wherein the third communication interface is a general packet radio service or Bluetooth interface.

21. A system, comprising:
an application server associated with an event configured to determine profile reception capabilities of a mobile terminal wherein the determining profile reception capabilities comprise determining the capability of the mobile terminal to install a particular profile, wherein the profile comprises a collection of user settings or preferences that an end user collectively manages;
a mobile communication network configured to receive event specific characteristics from the application server; and
at least one mobile terminal configured to connect to said network,
wherein the mobile network notifies the application server if the mobile terminal is associated with said event, and when responsive thereto the application server transmits the event specific profile to said mobile terminal; and
wherein the profile is an extended profile including at least one icon added to a menu of the mobile terminal, such that the at least one icon links to information regarding the event.

22. The apparatus of claim 11, wherein the determining server is further configured to determine the capability of the mobile terminal to at least one of receiving a particular profile, and installing a particular profile.

23. The system of claim 21, wherein the application server is further configured to determine the capability of the mobile terminal to at least one of receiving a particular profile, and installing a particular profile.

24. An apparatus, comprising:
determining means for determining profile reception capabilities of a mobile terminal, wherein the determining means determines the capability of the mobile terminal to install a particular profile, wherein the profile comprises a collection of user settings or preferences that an end user collectively manages;
first communications interface means for providing a mobile network with event specific information;
second communications interface means for receiving details of the mobile terminal associated with said event specific information; and
third communications interface means for transmitting the event specific profile to the mobile terminal associated with an event specific information;
wherein the profile is an extended profile including at least one icon added to a menu of the mobile terminal, such that the at least one icon links to information regarding the event.

* * * * *